United States Patent
Lewis

(10) Patent No.: US 10,817,401 B1
(45) Date of Patent: Oct. 27, 2020

(54) SYSTEM AND METHOD FOR JOB-TO-QUEUE PERFORMANCE RANKING AND RESOURCE MATCHING

(71) Applicant: R-Stor Inc., Saratoga, CA (US)

(72) Inventor: Bryan Wayne Lewis, Richfield, OH (US)

(73) Assignee: R-STOR INC., Saratoga, CA (US)

( * ) Notice: Subject to any disclaimer, the term of this patent is extended or adjusted under 35 U.S.C. 154(b) by 111 days.

(21) Appl. No.: 16/185,688

(22) Filed: Nov. 9, 2018

Related U.S. Application Data

(60) Provisional application No. 62/584,663, filed on Nov. 10, 2017.

(51) Int. Cl.
*G06F 11/00* (2006.01)
*G06F 11/34* (2006.01)
*G06F 9/50* (2006.01)

(52) U.S. Cl.
CPC .......... *G06F 11/3452* (2013.01); *G06F 9/505* (2013.01); *G06F 11/3428* (2013.01)

(58) Field of Classification Search
CPC ... G06F 9/505; G06F 11/3428; G06F 11/3452
See application file for complete search history.

(56) References Cited

U.S. PATENT DOCUMENTS

| | | | |
|---|---|---|---|
| 2006/0184939 A1* | 8/2006 | Sahoo | G06F 9/505 718/100 |
| 2016/0098334 A1* | 4/2016 | Hariharakrishnan | G06F 11/3428 702/186 |
| 2016/0224898 A1* | 8/2016 | Ryckbosch | G06N 20/00 |
| 2017/0249192 A1* | 8/2017 | Thompson | G06F 9/505 |

* cited by examiner

*Primary Examiner* — Joshua P Lottich
(74) *Attorney, Agent, or Firm* — Orrick, Herrington & Sutcliffe, LLP

(57) ABSTRACT

Systems and apparatuses for predicting computer job performance rankings across different computer architectures, configurations, and clusters and methods for making and using the same. The method can include running a new job on a selected computer system and identifying one or more nearby jobs that are nearby the new job. A performance of each of the nearby jobs across the available computer systems can be ranked. The available computer systems preferably include the selected computer system. The method also can estimate a rank of the new job on each of the available computer systems. In various embodiments, these technologies advantageously can be used to optimize the matching of jobs to computer systems.

20 Claims, 1 Drawing Sheet

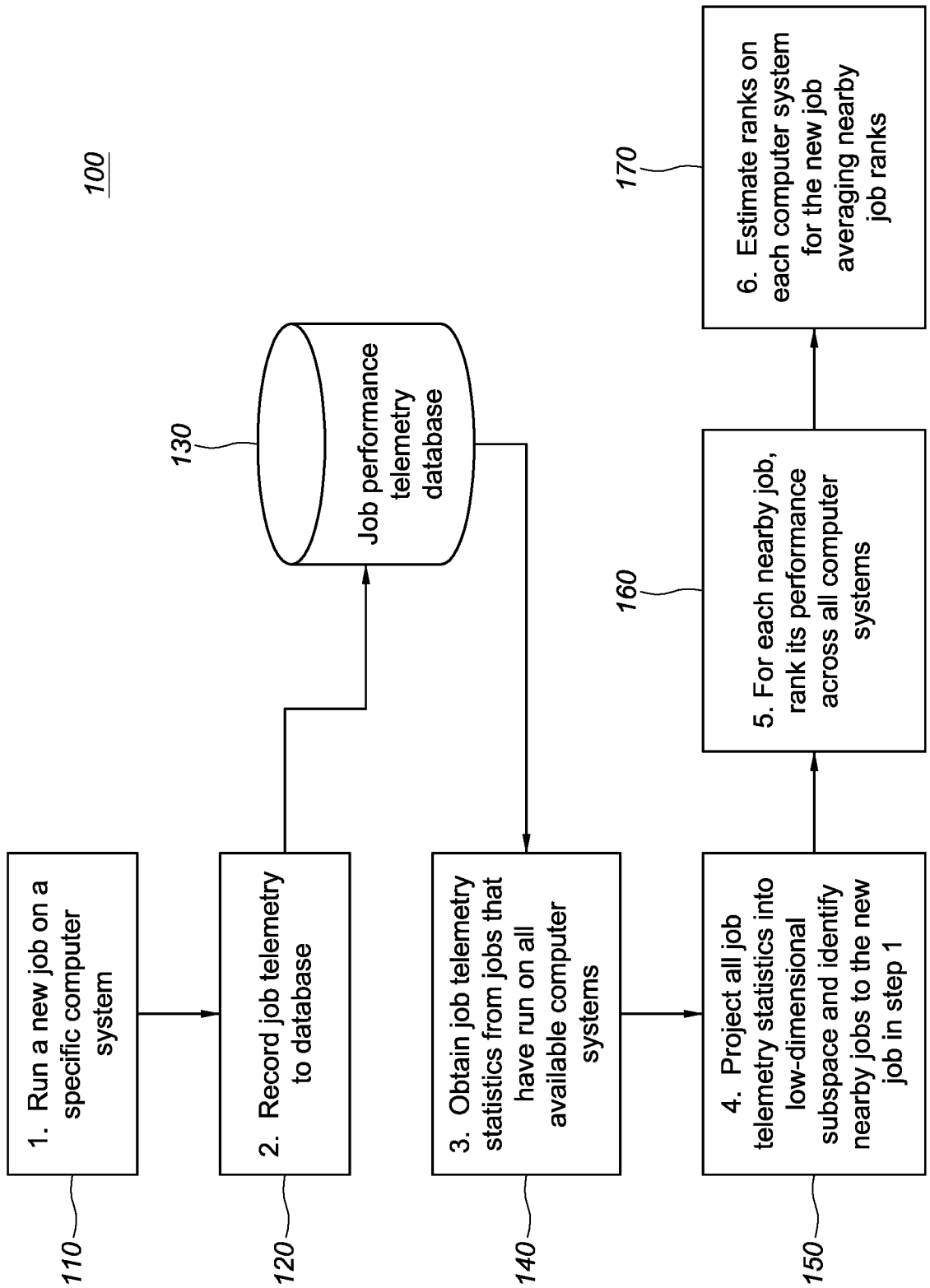

SYSTEM AND METHOD FOR JOB-TO-QUEUE PERFORMANCE RANKING AND RESOURCE MATCHING

CROSS-REFERENCE TO RELATED APPLICATIONS

This application claims the benefit of, and priority to, U.S. Provisional Application Ser. No. 62/584,663, filed Nov. 10, 2017, the disclosure of which is hereby incorporated herein by reference in its entirety and for all purposes.

FIELD

This specification relates generally to systems, apparatuses and methods for predicting computer job performance rankings across different computer architectures, configurations, and/or clusters.

The systems, apparatuses and methods disclosed herein describe particular embodiments for matching jobs (where a "job" refers, e.g., to a computer program plus configuration parameters and input data) to computer systems on which the jobs run better or best in order to optimize cost, energy efficiency, resource utilization, and other operating characteristics in modern cloud, high-performance computing (HPC), and enterprise datacenter environments. These embodiments are not intended to be exhaustive of the contemplated configurations and processes.

BACKGROUND

Matching jobs to available resources generally involves, at the lowest level, the allocation by central processors of work across their functional units using scheduling algorithms. Above that, a computer operating system generally applies its task scheduling algorithms to allocate processes and threads across available computing resources, such as a memory, a central processing unit (or CPU), a graphics processing unit (or GPU), storage, or a network, on an individual computer. And above that, cluster scheduling and batch queuing systems may allocate jobs across available cluster resources.

Batch scheduling systems typically use queue-based resource allocation methods with simple static allocation rules of resource allocation (like "high priority queue," "GPU queue," "long-running queue," etc.) to make their job placement decisions. Matching jobs to the queues on which the job will run best is generally left to the job submitter with these systems.

Other approaches like the Amazon's virtual CPU (or vCPU) or Burstorm's benchmark-based pricing use fixed benchmarks to uniformly price available resources relative to a fixed benchmark. See https://docs.aws.amazon.com/AWSEC2/latest/UserGuideiinstance-optimize-cpu.html, https://www.burstorm.com/. These approaches provide some comparative insight across disparate systems, but the comparison is relative to a specific benchmark that may not reflect the balance of resources required by a specific application.

There have also been other, mostly academic, approaches applying predictive modeling and machine learning techniques to predicting performance of specific jobs. See "Survey of HPC Performance Modeling and Prediction Tools" by Rob Allan, available at http://www.grids.ac.uk/NWGrid/prediction/prediction.html (overview of modeling approaches); Sandia National Laboratory's "Continuous whole-system monitoring toward rapid understanding of production HPC applications and systems," by Anthony Agelastos, et al., Parallel Computing 58 (2016): 90-106; and Berkeley AMP Laboratory's "Ernest: Efficient Performance Prediction for Large-Scale Advanced Analytics" by Shivaram Venkataraman, et al., available at https://amplab.cs.berkeley.edu/publication/ernest-efficient-performance-prediction-for-large-scale-advanced-analytics, NSDI, 2016

The existing approaches, however, typically require extensive experimentation with specific jobs, often tailoring their performance predictions to fine tune cluster size. They also do not adequately address estimated performance of a new job with few observations (performance measurements) across potentially diverse available resources.

In light of the foregoing and other problems associated with prior approaches, there exists a need for improved matching of jobs to computer systems.

SUMMARY

This specification describes new technologies relating to application of machine learning to estimate ranked performance of arbitrary jobs across a potentially very diverse universe of available computing resources. For example, the principles disclosed herein can be used to apply machine learning techniques to project test measurements from a new job into a space defined by performance measurements from previously measured jobs. According to various embodiments, nearby jobs to the new job can be identified and used to estimate ranked performance across a plurality of available computer systems. For example, identification of similar jobs can be accomplished using a regularized distance metric defined by projecting high-dimensional measurement data into information rich lower-dimensional spaces. According to various embodiments, the high-dimensional measurement data may include statistics of measured job relative resource utilization time series.

BRIEF DESCRIPTION OF THE DRAWINGS

The FIGURE illustrates an exemplary embodiment of a method for generating estimated performance rankings of a new job across available computer systems.

It should be noted that the FIGURE is not drawn to scale and that elements of similar structures or functions are generally represented by like reference numerals for illustrative purposes throughout the FIGURE. It also should be noted that the FIGURE is only intended to facilitate the description of the preferred embodiments. The FIGURE does not illustrate every aspect of the described embodiments and does not limit the scope of the present disclosure.

DETAILED DESCRIPTION OF THE PREFERRED EMBODIMENTS

Systems, apparatuses and methods for improved matching of jobs to computer systems are disclosed herein. According to various embodiments, the systems, apparatuses and methods are implement one or more of the following steps (not necessarily in the following order).

First, a test or single job run of a new job can be performed on at least one queue (or computer system). Second, job performance can be recorded in terms of relative resource utilization using collected high-fidelity system and/or performance counter metrics. Third, nearby jobs can be identified to the test job run. These nearby jobs preferably are jobs with similar relative resource utilization to the test job. Fourth, the performance of the identified nearby jobs can be ranked across all queues that the identified nearby jobs have run on. Fifth, the average (or median, or other similar statistic or a combination thereof) rank of the nearby jobs can be used on each system as an estimated performance ranking. Sixth, a measurement of ranking uniformity across queues of the identified nearby jobs can be used as an estimate of confidence in the performance ranking.

An exemplary method 100 for generating estimated performance rankings of a new job across available computer systems is shown in the FIGURE. Turning to the FIGURE, the method 100 can include, at 110, running a new job on a specific computer system (not shown). The new job is a new job for which performance rankings are desired and can be run any predetermined number of times on the specific computer system. In selected embodiments, for example, the new job can be run once, and/or the specific computer system can comprise any predetermined computer system.

At 120, the method 100 can include recording job telemetry for the new job. The job telemetry can be recorded in any preselected manner and preferably while the new job is being run. In selected embodiments, the job telemetry can be recorded in a database system 130. The method 100, for example, can include managing the job run and recording telemetry about performance of the job run in a job performance telemetry database 130, at 120.

The method 100 as shown in the FIGURE can include obtaining performance telemetry statistics for all jobs that have run on all available computer systems, at 140. The performance telemetry statistics preferably includes performance telemetry statistics for all jobs that have run on the specific computer system that ran the new job, at 110. In selected embodiments, the performance telemetry statistics can be obtained, at 140, after the running the new job on the specific computer system is complete. The job performance may be high-resolution and/or consist of many measurements as time series. Optionally, appropriate statistics, such as averages and/or medians, optionally can be extracted from the high-resolution data.

At 150, the method 100 can include projecting all job telemetry statistics into a low-dimension subspace and/or identifying nearby jobs to the new job. Job performance telemetry may high dimensional (with hundreds of measurements), noisy or even incomplete. The method 100, therefore, can mathematically regularize the performance telemetry statistics by projecting them into a low-dimensional subspace using principal components of truncated singular value decomposition.

Then, in the resulting regularized low-dimensional performance telemetry subspace, the N closest jobs to the new job can be found with respect to a suitable distance metric, such as, without limitation, a Euclidean distance, wherein N is a parameter of a distance metric determination algorithm. The parameter N can comprise any positive integer, such as three. For example, if the projected dimension is two and the distance metric is Euclidean, the closest jobs to the new job are simply the points closest to the coordinates of the new job in a scatter plot (not shown).

At 160, the method 100 can include ranking the job performance of each nearby job across all of the available computer systems. In other words, for each of the N closest jobs to the new job, the job performance can be ranked across all other computer systems. For instance, a ranking may be a real-valued number between zero (worst performance) and one (best performance).

The method 100, at 170, can include estimating the rank for the new job on each of the available computer systems. For each available computer system, for example, the method 100 can include averaging the N nearby job rankings, at 170, and reporting the nearby job rankings as the estimated ranking for the new job on the relevant available computer system.

The foregoing method 100 and similar methods can provide insight about performance across different systems. According to various embodiments, rather than using a single synthetic benchmark, or a set of synthetic benchmarks, the foregoing method can use a "benchmark" made up from historic jobs that can be similar to the new job. One of the benefits of this approach is the expected improvement in estimated performance rankings as the database of historic job performance data grows over time.

A distance between jobs in terms of measured relative resource utilization can be defined in any suitable manner. The space of measured resources may be high-dimensional. For example, according to various embodiments, it includes common operating system resource statistics, such as load averages, memory use statistics, individual CPU use statistics, general input/output (or I/O) statistics, etc., CPU hardware performance counters (which may include hundreds of CPU functional unit measurements), specialized networking performance measurements, accelerator hardware performance utilization measurements (GPUs, etc.), and/or other items. In various embodiments, one or more of these measurements can be time series sampled over the course of the job run. The space of performance measurements may include hundreds of dimensions. For example, the measurements may include considerable noise, such as from operating system runtime variability and/or shared tendency effects.

According to various embodiments, one or more models deployed according to the principles discussed herein can represent each job run on a specific queue as a point in a high-dimensional performance metric space. For example, each element in the space can be a statistic summarizing a measured performance metric time series. The statistics, for example, can be expressed relative to a maximum value of the performance metric or similar normalization. Additionally and/or alternatively, maxima can be generally theoretically and/or empirically determined by the maximum of all observed values. The distance between jobs run on a queue may be determined by any distance metric defined between points in the performance metric space.

One or more models may use one or more standard distance metrics including, without limitation, simple Euclidean distance, correlation, and/or partial correlation between points. These standard distance metrics are exemplary, and other distance metrics can also be supported, as desired.

High-dimensional spaces often include redundant information. Moreover, some measures of distance, or models based on them, can be very sensitive to measurement noise. One or models according to the principles of selected embodiments therefore can account for measurement noise sensitivity and/or information redundancy by using regularization techniques commonly used in machine learning. For example, the method 100 can project points into an information-rich, low-dimensional space defined by a truncated singular value decomposition of either Euclidean distances and/or Pearson correlation values. The method 100, additionally and/or alternatively, can apply sparsity constraints in the projected space with a result of providing insight into the important performance measurements that drive a specific job's performance Estimating regularized distances (e.g., in the projected space) advantageously can focus the measurement on the main information content in the data and/or reduce the influence of measurement noise on the result.

Various benefits discussed herein (and other benefits) advantageously can be made possible using the disclosed principles. For example, while conventional batch queuing systems, such as system that leave selection of queues up to the user and/or apply very simple constraint-based job placement, may sometimes be adequate for a single fixed shared resource like a departmental HPC system, such systems fail to optimize job placement across diverse resources (clouds, etc.). Synthetic benchmark-based resource pricing models likewise may assist in comparing performance and cost across diverse resources but can be made relative to a specific benchmark or suite of benchmarks that may not reflect the resource requirements of a specific job. As such, ultimate job placement can be still largely left to the user's judgement. The principles disclosed herein, however, can provide approaches and/or models that can significantly extend benchmark-based resource pricing models, for example, by essentially replacing the concept of a fixed benchmark with job-specific information using performance measurement knowledge from all previous jobs.

Accordingly, various benefits of job performance ranking mechanisms are disclosed herein. Although various implementations are discussed herein, the principles described herein are not limited to such. For example, while particular scenarios are referenced, the principles described herein can be applied to any suitable environment.

Accordingly, although particular embodiments have been described, the principles described herein can be applied to different types of environments and solutions. Certain embodiments have been described for the purpose of simplifying the description, and are set forth for illustrative purposes only. Reference to particular hardware or software terms herein can refer to any other type of suitable device, component, software, and so on. Moreover, the principles discussed herein can be generalized to any number and configuration of devices and protocols, and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments.

What is claimed is:

1. A method for generating estimated performance rankings of a new job across a plurality of available computer systems, comprising:
   running the new job on a selected computer system;
   identifying one or more nearby jobs that are nearby the new job;
   ranking a performance of a predetermined number of the nearby jobs across the available computer systems including the selected computer system; and
   estimating a performance rank of the new job on each of the available computer systems.

2. The method of claim 1, wherein said ranking the performance comprises ranking the performance of all of the nearby jobs across the available computer systems.

3. The method of claim 1, wherein said estimating the performance rank includes averaging performance rankings for a predetermined number of the nearby jobs and reporting the averaged performance rankings as the estimated performance rank of the new job.

4. The method of claim 1, wherein said running the new job includes recording job telemetry data for the new job, and wherein said estimating the performance rank is based at least in part on the recorded job telemetry data.

5. The method of claim 4, wherein said recording the job telemetry data comprises recording the job telemetry data for the new job during said running the new job.

6. The method of claim 4, further comprising managing said running the new job based at least in part on the recorded job telemetry data.

7. The method of claim 4, wherein said recording the job telemetry data comprises recording job telemetry data for all jobs that have previously been run on the available computer systems.

8. The method of claim 7, wherein said recording the job telemetry data for all jobs includes recording the job telemetry data for all jobs previously run on the available computer systems after said running the new job is complete.

9. The method of claim 7, wherein said recording the job telemetry data for all jobs comprises recording high-resolution job telemetry data for all jobs previously run on the available computer systems, and wherein said identifying the one or more nearby jobs includes identifying the one or more nearby jobs at least in part on the recorded high-resolution job telemetry data.

10. The method of claim 9, wherein said identifying the one or more nearby jobs includes projecting the recorded high-resolution job telemetry data into a low-dimension subspace.

11. The method of claim 10, wherein said projecting the recorded high-resolution job telemetry data comprises mathematically regularizing the recorded high-resolution job telemetry data.

12. The method of claim 10, wherein said projecting the recorded high-resolution job telemetry data into a low-dimension subspace comprises projecting the recorded high-resolution job telemetry data using principal components of truncated singular value decomposition.

13. The method of claim 9, wherein said identifying the one or more nearby jobs includes extracting one or more statistics from the recorded high-resolution job telemetry data and identifying the one or more nearby jobs at least in part on said extracting.

14. The method of claim 13, wherein said extracting the one or more statistics includes extracting an average value from the recorded high-resolution job telemetry data, extracting an average value from the recorded high-resolution job telemetry data or a combination thereof.

15. The method of claim 13, further comprising regularizing the one or more extracted statistics from the recorded high-resolution job telemetry data.

16. The method of claim 15, wherein said identifying the one or more nearby jobs includes projecting the regularized extracted statistics from the recorded high-resolution job telemetry data into a low-dimension subspace.

17. The method of claim 16, wherein said identifying the one or more nearby jobs includes identifying the one or more nearby jobs with the low-dimension subspace based upon a distance metric between the nearby jobs and the new job.

18. The method of claim 17, wherein said identifying the one or more nearby jobs comprises identifying the one or more nearby jobs with the low-dimension subspace based upon a Euclidean distance between the nearby jobs and the new job.

19. A computer program product for generating estimated performance rankings of a new job across a plurality of available computer systems, the computer program product being encoded on one or more non-transitory machine-readable storage media and comprising:

instruction for running the new job on a selected computer system;

instruction for identifying one or more nearby jobs that are nearby the new job;

instruction for ranking a performance of a predetermined number of the nearby jobs across the available computer systems including the selected computer system; and instruction for estimating a performance rank of the new job on each of the available computer systems.

20. A system for generating estimated performance rankings of a new job across a plurality of available computer systems, comprising:

a selected computer system for running the new job; and a server system for identifying one or more nearby jobs that are nearby the new job, ranking a performance of a predetermined number of the nearby jobs across the available computer systems including the selected computer system and estimating a performance rank of the new job on each of the available computer systems.

* * * * *